United States Patent
He

(10) Patent No.: US 8,774,759 B2
(45) Date of Patent: Jul. 8, 2014

(54) SECURITY CAPABILITY NEGOTIATION METHOD, SYSTEM, AND EQUIPMENT

(75) Inventor: Chengdong He, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 794 days.

(21) Appl. No.: 12/503,942

(22) Filed: Jul. 16, 2009

(65) Prior Publication Data

US 2009/0275309 A1    Nov. 5, 2009

Related U.S. Application Data

(63) Continuation of application No. PCT/CN2008/070880, filed on May 5, 2008.

(30) Foreign Application Priority Data

May 8, 2007  (CN) .......................... 2007 1 0074333

(51) Int. Cl.
    *H04M 1/66* (2006.01)
(52) U.S. Cl.
    USPC ........ 455/410; 455/436; 455/435.1; 455/509; 370/331; 370/338; 714/4.3
(58) Field of Classification Search
    USPC ........... 455/410, 436, 435.1, 509, 517, 456.1, 455/445; 370/231, 225, 352, 296, 331, 338, 370/328; 379/229, 88.04; 713/172; 726/22; 714/4.3
    See application file for complete search history.

(56) References Cited

U.S. PATENT DOCUMENTS

| 5,301,280 | A  * | 4/1994 | Schwartz et al. ............. 709/237 |
| 6,587,680 | B1   | 7/2003 | Ala-Laurila |
| 8,396,477 | B2 * | 3/2013 | Kanazawa et al. ............ 455/436 |
| 2002/0066011 | A1 | 5/2002 | Viallen |
| 2006/0026671 | A1 | 2/2006 | Potter et al. |
| 2007/0003062 | A1 | 1/2007 | Mizikovsky et al. |

(Continued)

FOREIGN PATENT DOCUMENTS

| CN | 1478365 A | 2/2004 |
| CN | 1601943 A | 3/2005 |

(Continued)

OTHER PUBLICATIONS

GPRS Core Network, Wikipedia, 8 pages.*

(Continued)

*Primary Examiner* — Mahendra Patel

(57) ABSTRACT

A security capability negotiation method is applicable to perform security capability negotiation during a mobile network handover. The method includes the following processes: a second network receives a handover request sent by a first network; an access network entity of the second network selects a corresponding security capability, or an access network entity and a core network (CN) entity of the second network respectively select a corresponding security capability; the second network sends the selected security capability to a user equipment (UE) via the first network. Moreover, a security capability negotiation system is also provided. Consistent with the provided system and method, it may be unnecessary for the MME to know the security capability of the corresponding eNB in a certain manner during a handover from a 2G/3G network to an LTE network. Meanwhile, during the handover from the LTE network to the 3G network, the SGSN does not need to introduce new requirements.

15 Claims, 4 Drawing Sheets

(56) References Cited

U.S. PATENT DOCUMENTS

| | | | |
|---|---|---|---|
| 2007/0021120 A1* | 1/2007 | Flore et al. | 455/436 |
| 2007/0060127 A1 | 3/2007 | Forsberg | |
| 2007/0213060 A1* | 9/2007 | Shaheen | 455/436 |
| 2007/0248064 A1* | 10/2007 | Shaheen | 370/338 |
| 2008/0242301 A1* | 10/2008 | Osterling et al. | 455/436 |
| 2009/0275309 A1* | 11/2009 | He | 455/410 |
| 2010/0246533 A1* | 9/2010 | Lundin et al. | 370/332 |

FOREIGN PATENT DOCUMENTS

| | | |
|---|---|---|
| CN | 1630404 A | 6/2005 |
| CN | 1794682 A | 6/2006 |
| CN | 1867185 A | 11/2006 |
| CN | 101304600 B | 11/2008 |
| EP | 1 871 134 A1 | 12/2007 |
| GB | 2377589 A | 1/2003 |
| JP | 2003516000 A | 5/2003 |
| WO | 2004054224 A1 | 6/2004 |
| WO | WO 2006/002676 A1 | 1/2006 |
| WO | WO 2007/025487 A1 | 3/2007 |

OTHER PUBLICATIONS

MME and base station, Google books, 1 page.*
Networking—Something Good to Know, May 9, 2008, http://conningtech.wordpress.com/, 22 pages.*
System Architecture Evolution (SAE), Wikipedia, 9 pages.*
International Search Report from P.R. China in International Application No. PCT/CN2008/070880 mailed Aug. 14, 2008.
European Patent Office Communication pursuant to Article 94(3) EPC, European search opinion for Application No. 08734236.6, mailed May 30, 2011, Huawei Technologies C., LTD 4 pgs.
3GPP; "Security context transfer between 3GPP access systems", 3GPP TSG SA WG2 Architecture—S2 #56, Rel-8 Ad-hoc S2-070687, Feb. 12-15, 2 pgs.
GSM; 3$^{rd}$ Generation Partnership Project; Technical Specification Group Services and System Aspects; Rationale and track of security decisions in Long Term Evolved (LTE) RAN / 3GPP System Architecture Evolution: (SAE) (Release 8) 3GPP TR 33.821 V0.2.0, Apr. 2007.
Notice of Reasons for Rejection issue in related Japanese Patent Application No. 2009-553896, dated Dec. 20, 2011.
Search report issued in corresponding European application No. 08734236.6,dated Aug. 20, 2013,total 5 pages.
Search report issued in corresponding Chinese application No. 201110378685.X,dated Aug. 5, 2013,total 2 pages.
3GPP TR 23.882 V0.10.0,3rd Generation Partnership Project-;Technical Specification Group Services and System Aspects;3GPP System Architecture Evolution:Report on Technical Options and Conclusions(Release 7),Jan. 2006, total 96 pages.
3GPP TR 33.821, "3$^{rd}$ Generation Partnership Project; Technical Specification Group Services and System Aspects; Rationale and track of security decisions in Long Term Evolved (LTE) RAN / 3GPP System Architecture Evolution (SAE) (Release 8)," V0.1.0 (2007-0), http://www.3gpp.org, *3GPP Organizational Partners* (2006), 80 pages.
English translation of Written Opinion of the International Searching Authority, issued by the State Intellectual Property Office, P.R. China, mailed Aug. 14, 2008, in the PCT/CN2008/070880, 4 pages.
Third office action issued in corresponding European application No. 08734236.6,dated Apr. 3, 2013,total 6 pages.
3GPP TR 33.821 V0.3.0,3rd Generation Partnership Project;Technical Specification Group Services and System Aspects; Rationale and track of security decisions in Long Term Evolved (LTE) RAN / 3GPP System Architecture Evolutio (SAE) (Release 8),May 2007,total 84 pages.

* cited by examiner

SECURITY CAPABILITY NEGOTIATION METHOD, SYSTEM, AND EQUIPMENT

CROSS-REFERENCE TO RELATED APPLICATION

This application is a continuation of PCT application No. PCT/CN2008/070880, filed on May 5, 2008, titled "SECURITY CAPABILITY NEGOTIATION METHOD, SYSTEM, AND EQUIPMENT", which claims the priority of Chinese Patent Application No. 200710074333.9, filed on May 8, 2007, titled "SECURITY CAPABILITY NEGOTIATION METHOD AND SYSTEM", the contents of both of which are incorporated herein by reference.

FIELD

The present disclosure relates to the field of communications, and more particularly to a security capability negotiation method, system, and equipment.

BACKGROUND

Referring to FIG. 1, an existing $3^{rd}$ Generation Partnership Project (3GPP) radio network is divided into a 3GPP radio access network (RAN) and a core network (CN).

The 3GPP RAN is further classified into three types as follows.

GSM edge radio access network (GERAN): 2G/2.5G access network, collectively referred to as 2G access network below, and including a base transceiver station (BTS) and a base station controller (BSC).

Universal terrestrial radio access network (UTRAN): 3G access network, including a node B (NodeB) and a radio network controller (RNC).

Evolved UMTS terrestrial radio access network (EUTRAN): also known as future long term evolution (LTE) access network, including an evolved node B (eNodeB, and eNB for short below).

The above three RANs are all configured to implement functions related to radio services, and meanwhile realize security capability negotiation with terminals.

A 2G/3G core network is further divided into a circuit-switched (CS) domain and a packet-switched (PS) domain. For ease of illustration, CS-related entities are omitted, and only the PS domain remains. The PS domain performs data service exchange and routing with external packet-based networks beforehand, and includes a serving GPRS support node (SGSN) and a gateway GPRS support node (GGSN). The SGSN is mainly configured to realize route-forwarding, mobility management, session management, and user authentication, and the GGSN is mainly configured to realize the connection with the external packet-based networks, and also implement data transmission on the user plane.

A future evolved core network is also referred to as a system architecture evolution (SAE), including entities such as a mobility management entity (MME) and SAE gateway (SAE GW)/packet data network gateway (PDN GW)/home subscriber server (HSS). Similar to the SGSN, the MME is mainly configured to realize mobility management and user authentication. The SAE GW/PDN GW serves as anchor points on the user plane between different access systems. The HSS is mainly configured to store user subscription data.

In the 2G network, the SGSN performs the security capability algorithm negotiation between the signaling plane and the user plane. In the 3G network, the RNC performs the security capability algorithm negotiation between the signaling plane and the user plane. In the evolved network LTE/SAE, as the RNC/SGSN does not exist, the MME performs the non-access signaling (NAS) algorithm negotiation, and the eNB performs the radio resource control (RRC)/user plane (UP) algorithm negotiation.

When a user is handed over from a 2G/3G network (2G/3G) to an LTE network, or from an LTE to a 2G/3G network, as the entities responsible for the security capability negotiation change and the security capabilities thereof may be different, the security capability negotiation needs to be re-performed. Here, the security capability negotiation means encryption algorithm for the 2G network, means integrity protection algorithm and encryption algorithm for the 3G network, and means NAS algorithm (encryption algorithm and integrity protection algorithm), RRC algorithm (encryption algorithm and integrity protection algorithm), and UP algorithm (encryption algorithm) for the LTE network.

Particularly, during the handover from the LTE network to the 2G/3G network, a user equipment (UE) sends its own GERAN (encryption algorithm)/UTRAN security capability (encryption algorithm and integrity protection algorithm) carried in an initial Layer 3 message to the MME. The MME then sends the capabilities of the UE to the SGSN. The SGSN selects and sends the corresponding GERAN/UTRAN security capability algorithm to the UE through the MME. During the handover from the LTE to 2G, the SGSN selects the security capability algorithm. However, during the handover from the LTE to 3G, according to the above description about the 3G network, the RNC, instead of the SGSN, selects the security capability algorithm; otherwise, the SGSN has to introduce a new requirement of selecting the security capability algorithm. Meanwhile, the SGSN must know the security capability of the RNC in a certain manner, and then sends the selected algorithm to the RNC, so that additional interaction between the SGSN and the RNC needs to be constructed.

During the handover from the 2G/3G to the LTE, the SGSN queries the UE for the NAS (encryption algorithm and integrity protection algorithm)/UP (encryption algorithm)/RRC (encryption algorithm and integrity protection algorithm) security capability. During the handover from the 2G/3G to the LTE, the SGSN sends the capabilities of the UE to the MME. Then, the MME selects and sends all the NAS/RRC/UP security capability algorithms to the UE through the SGSN.

In the implementation of the present invention, it is found in the prior art that, as the MME selects all the NAS/RRC/UP security capability algorithms, the MME must know the security capability of the corresponding eNB in a certain manner (for example, by configuring or extending interactive messages with the eNB), thus resulting in an inflexible configuration and a complicated process flow.

SUMMARY

Embodiments of the present disclosure are directed to a security capability negotiation method, system, and equipment, so as to facilitate the security capability negotiation during the network handover.

In an embodiment of the present disclosure, a security capability negotiation method is provided, which is applicable to perform security capability negotiation during a mobile network handover. The method includes the following process:

A second network receives a handover request sent by a first network.

An access network entity of the second network selects a corresponding security capability, or an access network entity and a core network (CN) entity of the second network respectively select a corresponding security capability.

The second network sends the selected security capability to a User Equipment (UE) via the first network.

Consistent with an embodiment of the present disclosure, a security capability negotiation system is provided, which is applicable to perform security capability negotiation during a mobile network handover. The system includes an access network entity and a core network entity of a first network, and an access network entity and a core network entity of a second network.

The access network entity of the second network is configured to select a corresponding security capability when the first network requests to hand over to the second network.

The core network entity of the second network is configured to select a corresponding security capability together with the access network entity of the second network when the first network requests for handing over to the second network.

The core network entity and the access network entity of the first network are configured to send the security capabilities selected by the second network to a user equipment (UE).

Consistent with an embodiment of the present disclosure, a network including an access network entity and a core network entity is further provided.

The access network entity is configured to receive a handover request sent by a peer-end network.

The core network entity is configured to select and send a corresponding security capability to the UE via the peer-end network together with the access network entity of the network when the peer-end network requests to hand over to the current network.

The embodiments of the present disclosure provide at least the following effects. During the handover from the 2G/3G to the LTE network, the MME and the eNB respectively implement the negotiation of the NAS security algorithm and the RRC/UP security algorithm, so that it is unnecessary for the MME to know the security capability of the corresponding eNB in a certain manner (for example, by configuring or extending interactive messages with the eNB). Meanwhile, during the handover from the LTE network to the 3G network, a new requirement for the SGSN is avoided, and the interaction between the SGSN and the RNC is also unnecessary.

DETAILED DESCRIPTION OF THE EMBODIMENTS

Embodiments of the present disclosure are illustrated in detail below with reference to the accompanying drawings.

Figure 1:
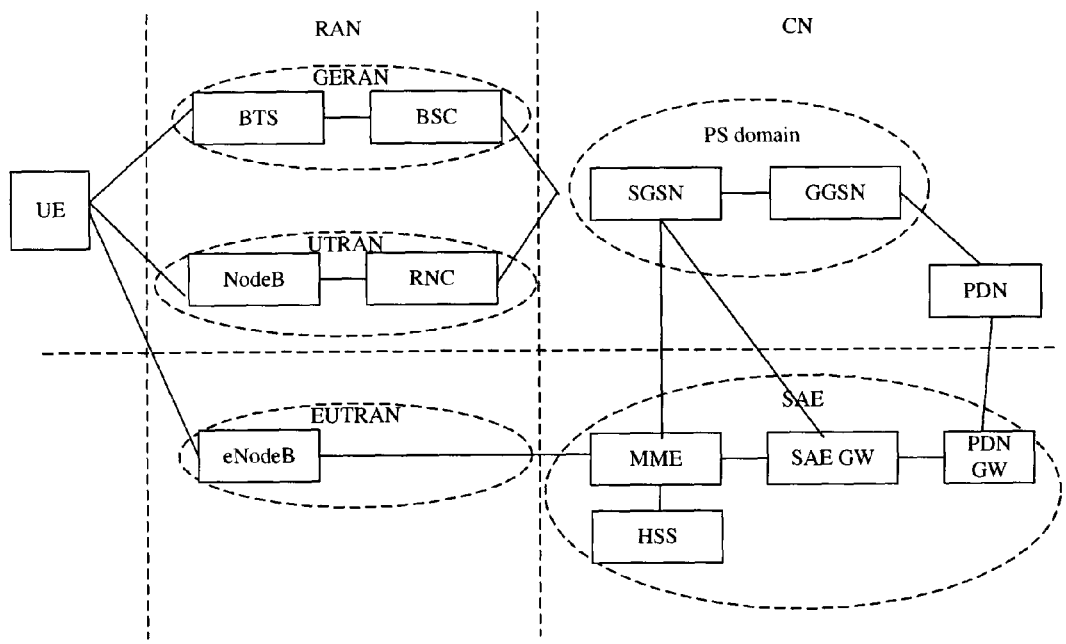
FIG. 1 is a structural view of a conventional 3GPP radio network.
Figure 2:
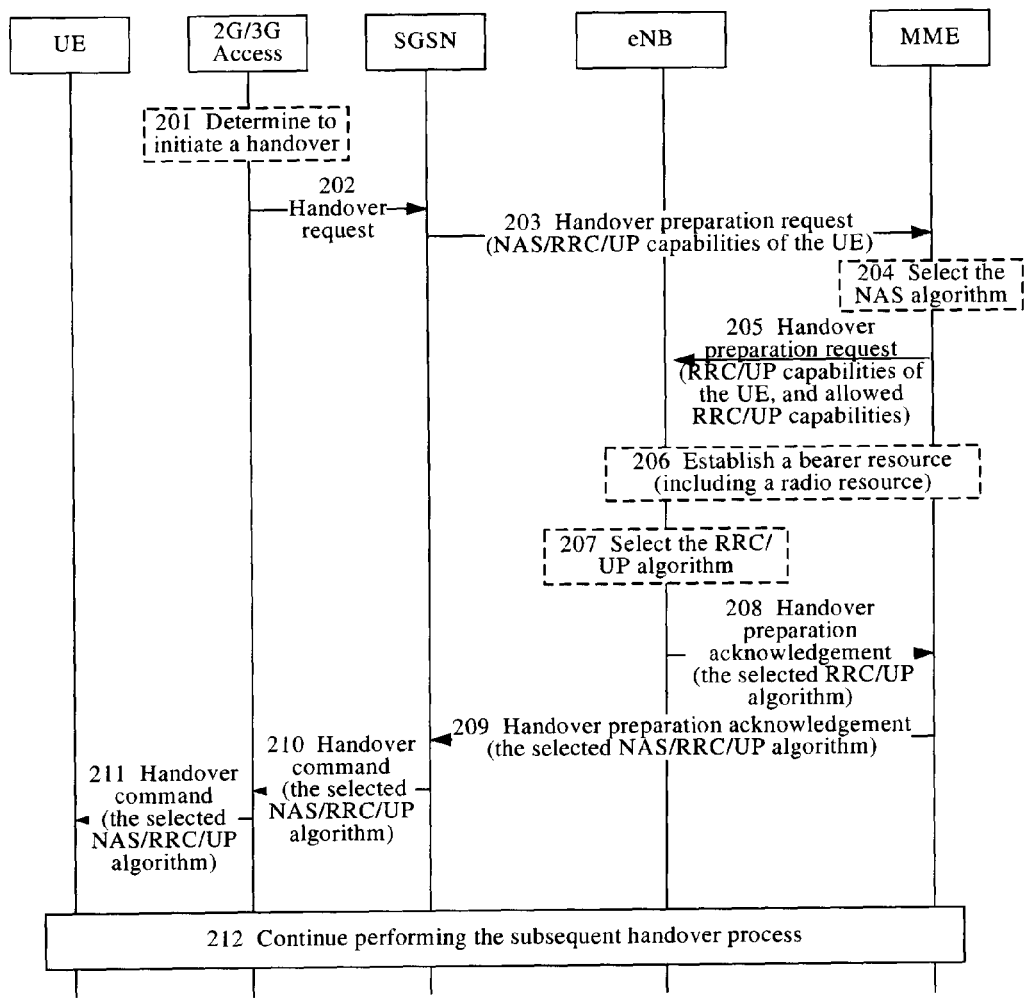
FIG. 2 is a flow chart illustrating a security capability negotiation method during the handover from a 2G/3G network to an LTE network according to a first embodiment of the present disclosure.

Referring to FIG. 2, the security capability negotiation method according to the first embodiment includes the following processes.

In this embodiment, the UE is handed over from 2G/3G to the LTE. First, it is assumed that a UE accesses services via a 2G/3G access network (2G/3G Access).

In process 201, the 2G/3G access network determines to initiate a handover.

In process 202, the 2G/3G access network initiates a handover request message to the SGSN.

In process 203, the SGSN initiates a handover preparation request message to the MME. The handover preparation request message carries various security capability sets supported by the UE, including NAS algorithm (encryption algorithm and integrity protection algorithm), RRC algorithm (encryption algorithm and integrity protection algorithm), and UP algorithm (encryption algorithm).

Here, the SGSN may obtain the security capability sets supported by the UE in the following methods.

The SGSN directly requests the UE to send the security capability sets supported thereby.

A 2G/3G access network entity (BSS or RNC) first determines to initiate a handover, then requests the UE for the security capability sets supported thereby, and sends the capability sets to the SGSN in process 202.

In process 204, the MME selects a NAS algorithm (encryption algorithm and integrity protection algorithm) according to the UE supported NAS algorithm (encryption algorithm and integrity protection algorithm), the system allowable NAS algorithm (encryption algorithm and integrity protection algorithm), together with the NAS algorithm (encryption algorithm and integrity protection algorithm) supported by the MME itself.

It should be noted that, as the UE supported NAS algorithm (encryption algorithm and integrity protection algorithm), the system allowable NAS algorithm (encryption algorithm and integrity protection algorithm), and the NAS algorithm (encryption algorithm and integrity protection algorithm) supported by the MME itself are all various, the selected NAS algorithm (encryption algorithm and integrity protection algorithm) is a NAS algorithm (encryption algorithm and integrity protection algorithm) supported by all the UE, the system and the MME.

In process 205, the MME sends a handover preparation request message to the eNB. The handover preparation request message carries the UE supported RRC algorithm (encryption algorithm and integrity protection algorithm) and UP algorithm (encryption algorithm), and may also carry the system allowable RRC algorithm (encryption algorithm and integrity protection algorithm) and UP algorithm (encryption algorithm).

In process 206, a bearer resource between the eNB and the MME is established, including the establishment of a radio resource.

In process 207, the eNB selects the RRC algorithm (encryption algorithm and integrity protection algorithm) and UP algorithm (encryption algorithm) according to the UE supported RRC algorithm (encryption algorithm and integrity protection algorithm) and UP algorithm (encryption algorithm), together with the RRC security capability sets (encryption algorithm and integrity protection algorithm) and UP security capability sets (encryption algorithm) supported by the eNB itself.

It should be noted that, as the UE supported RRC algorithm (encryption algorithm and integrity protection algorithm) and UP algorithm (encryption algorithm), the system allowable RRC algorithm (encryption algorithm and integrity protection algorithm) and UP algorithm (encryption algorithm), and the RRC algorithm (encryption algorithm and integrity protection algorithm) and UP algorithm (encryption algorithm) supported by the eNB itself are various, the selection here means selecting the RRC algorithm (encryption algorithm and integrity protection algorithm) and UP algorithm (encryption algorithm) which are both supported by the UE and the MME.

In process 205, if the handover preparation request message sent by the MME to the eNB also carries the system allowable RRC algorithm (encryption algorithm and integrity protection algorithm) and UP algorithm (encryption algorithm), the eNB may further combine the system allowable RRC algorithm (encryption algorithm and integrity protection algorithm) and UP algorithm (encryption algorithm) to select the RRC algorithm (encryption algorithm and integrity protection algorithm) and UP algorithm (encryption algorithm) which are supported by all the UE, the MME and the system.

In process 208, the eNB sends a handover preparation acknowledgement message to the MME. The handover preparation acknowledgement message carries the selected RRC algorithm (encryption algorithm and integrity protection algorithm) and UP algorithm (encryption algorithm).

In process 209, the MME sends a handover preparation acknowledgement message to the SGSN. The handover preparation acknowledgement message carries the selected NAS algorithm (encryption algorithm and integrity protection algorithm), RRC algorithm (encryption algorithm and integrity protection algorithm), and UP algorithm (encryption algorithm).

In processes 210 to 211, the SGSN sends a handover command message to the UE via the 2G/3G access network, for indicating the UE to hand over to a destination network. The handover command message carries the selected NAS algorithm (encryption algorithm and integrity protection algorithm), RRC algorithm (encryption algorithm and integrity protection algorithm), and UP algorithm (encryption algorithm).

In process 212, the subsequent handover process is implemented.

Thereby, the security capability negotiation between the UE and the network equipment (eNB/MME) is completed.

Process 204 may also be performed between processes 205 and 209. Process 207 may also be performed before process 206.

In this embodiment, during the handover from the 2G/3G to the LTE network, the NAS algorithm protection is implemented between the UE and the MME, the RRC/IUP algorithm protection is implemented between the UE and the eNB, and the MME and the eNB are respectively configured to realize the negotiation of the NAS security algorithm and the RRC/UP security algorithm, so that it is unnecessary for the MME to know the security capability of the corresponding eNB in a certain manner (for example, by configuring or extending interactive messages with the eNB) as in the prior art.

Figure 3:
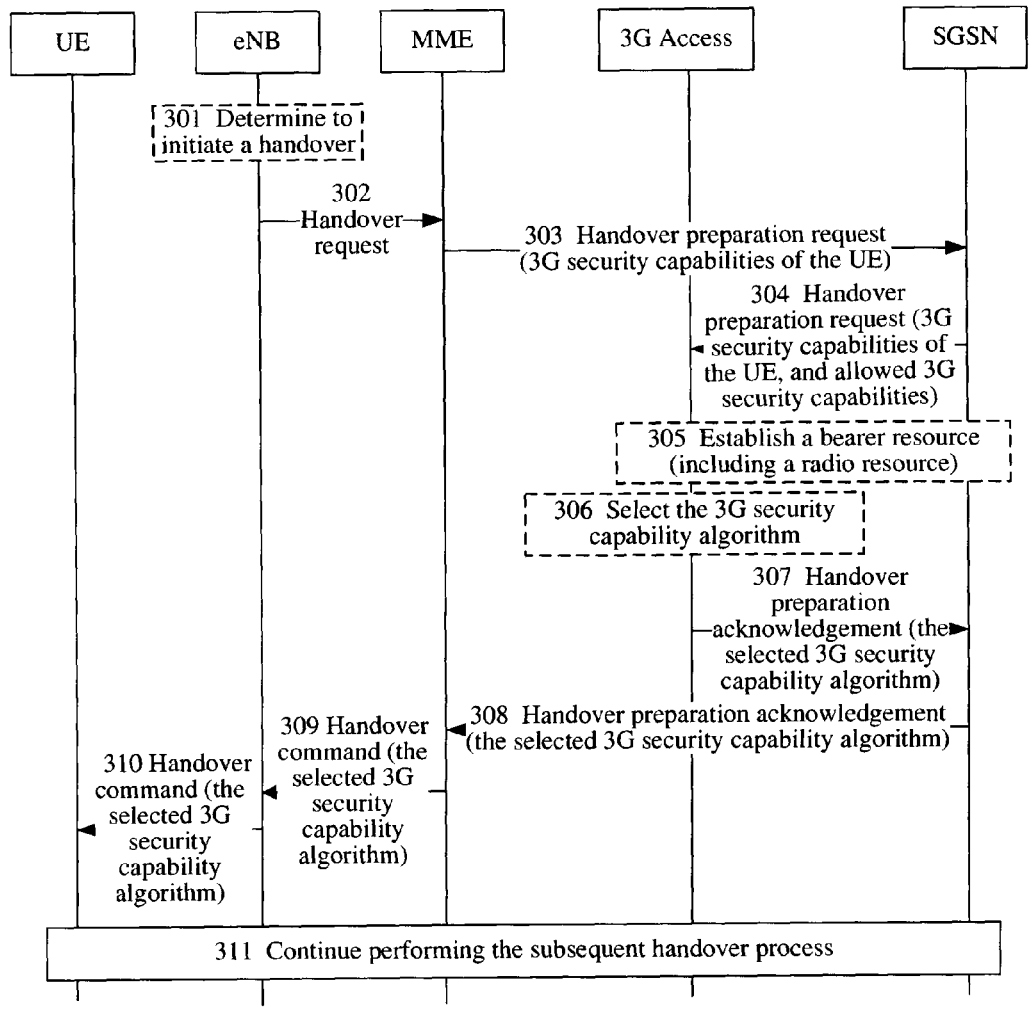
FIG. 3 is a flow chart illustrating a security capability negotiation method during the handover from an LTE network to a 3G network according to a second embodiment the present disclosure.

Referring to FIG. 3, in a second embodiment of the present disclosure, a security capability negotiation method includes the following processes.

In this embodiment, a UE hands over from an LTE to 3G. First, it is assumed that a UE accesses services via an LTE access network (eNB).

In process 301, the eNB determines to initiate a handover.

In process 302, the eNB initiates a handover request message to the MME.

In process 303, the MME initiates a handover preparation request message to the SGSN. The handover preparation request message carries 3G security capability sets supported by the UE, including encryption algorithm and integrity protection algorithm.

Here, the MME may obtain the 3G security capability sets supported by the UE in the following methods.

Before the handover, an initial Layer 3 message already carries the 3G security capability sets supported by the UE, and the UE sends the capability sets to the MME.

The MME directly requests the UE to send the 3G security capability sets supported by the UE.

The eNB first determines to initiate a handover, then requests the UE for the 3G security capability sets supported by the UE, and sends the capability sets to the MME in process 302.

In process 304, the SGSN sends a handover preparation request message to the 3G access network (RNC). The handover preparation request message carries the 3G security capability sets supported by the UE. The 3G security capability sets supported by the UE includes encryption algorithm and integrity protection algorithm, and the handover preparation request may also carry the system allowable 3G security capability sets.

In process 305, a bearer resource between the 3G access network (RNC) and the SGSN is established, including the establishment of a radio resource.

In process 306, the 3G access network (RNC) selects the 3G security capability sets according to the 3G security capability sets supported by the UE together with the 3G security capability sets supported by the 3G access network itself.

It should be noted that, as the 3G security capability sets supported by the UE and the 3G security capability sets supported by the 3G access network (RNC) itself are various, the selection here means selecting the 3G security capability sets supported by the UE and the 3G access network (encryption algorithm and integrity protection algorithm) from the above two categories of 3G security capability sets.

In process 304, if the handover preparation request message sent by the SGSN to the 3G access network (RNC) also carries the system allowable 3G security capability sets, the 3G access network (RNC) may further combine the system allowable 3G security capability sets to select the 3G security capability sets.

In process 307, the 3G access network (RNC) sends a handover preparation acknowledgement message to the SGSN. The handover preparation acknowledgement message carries the selected 3G security capability sets.

In process 308, the SGSN sends a handover preparation acknowledgement message to the MME. The handover preparation acknowledgement message carries the selected 3G security capability sets.

In processes 309 to 310, the MME sends a handover command message to the UE via the eNB, indicating the UE to hand over to a destination network. The message carries the selected 3G security capability sets.

In process 311, the subsequent handover process is implemented.

Thereby, the security capability negotiation between the UE and the network equipment (RNC) is completed.

Process 306 may also be performed before process 305.

In this embodiment, the SGSN does not need to introduce new requirements during the handover from the LTE to the 3G network.

Figure 4:
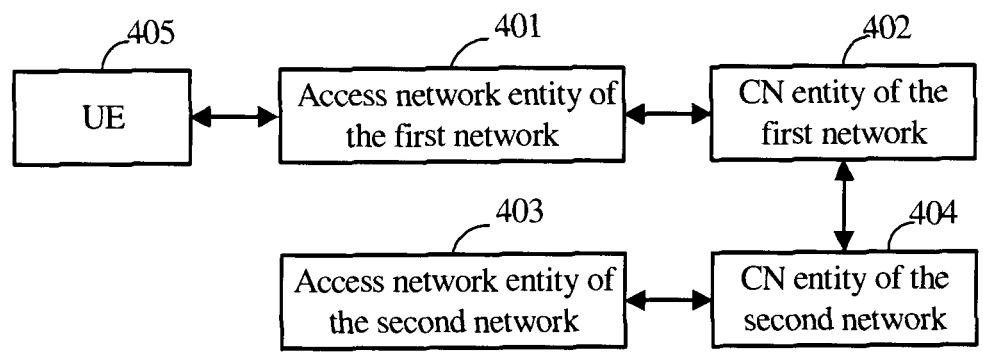
FIG. 4 is a schematic structural view illustrating a security capability negotiation system according to a third embodiment of the present disclosure.

Referring to FIG. 4, in a third embodiment of the present disclosure, a security capability negotiation system is provided, which is applicable to perform security capability negotiation during a mobile network handover. The system includes an access network entity 401 and a core network entity 402 of a first network, and an access network entity 403 and a core network entity 404 of a second network. The access network entity 403 of the second network is configured to select a corresponding security capability when the first network requests to be handed over to the second network. The core network entity 404 of the second network is configured to select a corresponding security capability together with the access network entity 403 of the second network when the first network requests to be handed over to the second network. The core network entity 402 and the access network entity 401 of the first network are configured to send the security capabilities selected by the second network to a UE 405.

In this embodiment, a network including an access network entity and a CN entity is further provided. The access network entity is configured to receive a handover request sent by a peer-end network. The CN entity is configured to select and send a corresponding security capability to the UE via the peer-end network together with the access network entity of the network when the peer-end network requests to be handed over to the current network.

When the UE hands over from the 2G/3G network to the LTE network, the first network is a 2G network or a 3G network, the access network entity of the 2G network includes a BTS and a BSC. The access network entity of the 3G network includes a node (NodeB) and an RNC. The core network entity of the 2G/3G network includes an SGSN. The second network is an LTE RAN, the access network entity thereof is an evolved node (eNodeB), and the core network entity thereof is an MME. The security capability includes NAS integrity protection and encryption algorithm, RRC integrity protection and encryption algorithm, and UP encryption algorithm. The MME is configured to select the NAS integrity protection and encryption algorithm, and the eNodeB is configured to select the RRC integrity protection, encryption algorithm, and UP encryption algorithm. The working principle and process are shown in FIG. 2, and the details will not be repeated herein. The MME and the eNB are adopted to realize the negotiation of the NAS security algorithm and the RRC/UP security algorithm respectively, so that it is unnecessary for the MME to know the security capability of the corresponding eNB in a certain manner (for example, by configuring or extending interactive messages with the eNB) as in the prior art.

When the UE hands over from the LTE network to the 3G network, the access network entity of the first network is eNodeB, the core network entity of the first network is MME, the access network entity of the second network is RNC, and the core network entity of the second network is SGSN. The security capability includes 3G security capability sets, and the 3G security capability sets further include encryption algorithm and integrity protection algorithm. The working principle and process are shown in FIG. 2, and the details will not be repeated herein. The RNC is configured to select the 3G security capability sets, so that the SGSN does not need to introduce new requirements during the handover from the LTE to the 3G network, and the interaction between the SGSN and the RNC is also unnecessary.

Through the above description of the embodiments, it is apparent to those skilled in the art that the embodiments may be accomplished by software on a necessary universal hardware platform, and definitely may also be accomplished by hardware. Therefore, some embodiments of the present disclosure can be substantially embodied in the form of a software product. The software product may be stored in a non-volatile storage medium such as a CD-ROM, USB disk, or removable hard disk, and contains several instructions to indicate a communication equipment (for example, a personal computer, server, or network equipment) to perform the method as described in the embodiments of the present disclosure.

It will be apparent to those skilled in the art that various modifications and variations can be made to the embodiments of the present disclosure without departing from the scope or spirit of the disclosure. In view of the foregoing, it is intended that the disclosed embodiments cover modifications and variations thereof provided that they fall within the scope of the following claims and their equivalents.

What is claimed is:

1. A method for security capability negotiation during a handover of a user equipment (UE) from a first network to a second network, wherein the first network is a 2G or 3G network, the second network is a long term evolution (LTE) access network, and the security capabilities include a radio resource control (RRC) algorithm and a user plane (UP) encryption algorithm, comprising:
   receiving, by an evolved node B (eNodeB) of the second network, a handover preparation request message from a mobility management entity (MME) of the second network, wherein the handover preparation request message includes a RRC algorithm and a UP encryption algorithm supported by the UE;
   selecting, by the eNodeB, a RRC algorithm and a UP encryption algorithm supported by both the UE and the eNodeB, according to the RRC algorithm and the UP encryption algorithm supported by the UE and a RRC algorithm and a UP encryption algorithm supported by the eNodeB; and
   sending, by the eNodeB, the selected RRC algorithm and the selected UP encryption algorithm to the first network.

2. The method according to claim 1, the selecting further comprising:
   combining, by the eNodeB, the RRC algorithm and the UP encryption algorithm supported by a security negotiation system, the security negotiation system including the UE and the MME.

3. The method according to claim 1, further comprising:
   selecting, by the MME, a Non-Access signaling (NAS) algorithm supported by both the UE and the MME, according to a NAS algorithm supported by the UE and a NAS algorithm supported by the MME, wherein the security capabilities include the NAS algorithm.

4. A system for security capability negotiation during a handover of a user equipment (UE) to a long term evolution (LTE) network from a non-LTE network, wherein the security capabilities include a radio resource control (RRC) algorithm, a user plane (UP) encryption algorithm and a Non-Access Signaling (NAS) algorithm, comprising:
   an evolved node B (eNodeB) of the LTE network; and
   a mobility management entity (MME) of the LTE network communicatively connected with the eNodeB,
   wherein, the MME is configured to:
      receive a handover request from the non-LTE network, the handover request including a NAS algorithm, a RRC algorithm and a UP encryption algorithm supported by the UE,
      select a NAS algorithm supported by both the UE and the MME according to the NAS algorithm supported by the UE and a NAS algorithm supported by the MME, send a handover preparation request message to the eNodeB, the handover preparation request message including the RRC algorithm and the UP encryption algorithm supported by the UE, receive from the eNodeB a selected RRC algorithm and a selected UP encryption algorithm each supported by the UE and the eNodeB, and send to the non-LTE network the selected NAS algorithm, the selected RRC algorithm and the selected UP encryption algorithm, and wherein the eNodeB is configured to:

receive the handover preparation request message from the MME, select a RRC algorithm and a UP encryption algorithm supported by both the UE and the eNodeB according to the RRC algorithm and the UP encryption algorithm supported by the UE and an RRC algorithm and a UP encryption algorithm supported by the eNodeB, and send the selected RRC algorithm and the selected UP encryption algorithm to the MME.

5. The method according to claim 1, wherein the RRC algorithm comprises: an encryption algorithm and an integrity protection algorithm.

6. The method according to claim 3, wherein the NAS algorithm comprises: an encryption algorithm and an integrity protection algorithm.

7. The system according to claim 4, wherein the RRC algorithm comprises an encryption algorithm and an integrity protection algorithm, and the NAS algorithm comprises an encryption algorithm and an integrity protection algorithm.

8. A method for security capability negotiation during a handover of a user equipment (UE) to a long term evolution (LTE) network from a non-LTE network, wherein the non-LTE network is a 2G or 3G network, and the security capabilities include a Non-Access Signaling (NAS) algorithm, a radio resource control (RRC) algorithm and a user plane (UP) encryption algorithm, comprising:

receiving, by a mobility management entity (MME) in the LTE network, a handover request from a non-LTE network, wherein the handover request includes a NAS algorithm, a RRC algorithm and a UP encryption algorithm supported by the UE;

sending, by the MME, the RRC algorithm and the UP encryption algorithm supported by the UE to an evolved node B (eNodeB) in the LTE network;

receiving, by the MME, from the eNodeB, a selected RRC algorithm and a selected UP encryption algorithm supported by both the UE and the eNodeB;

sending, by the MME, the selected RRC algorithm and the selected UP encryption algorithm to the non-LTE network.

9. The method according to claim 8, the method further comprises:

selecting, by the MME, a NAS algorithm supported by both the UE and the MME, according to the NAS algorithm supported by the UE and a NAS algorithm supported by the MME; and wherein the sending, by the MME, the selected RRC algorithm and the selected UP encryption algorithm to the non-LTE network further comprises:

sending, by the MME, the selected NAS algorithm, the selected RRC algorithm and the selected UP encryption algorithm to the non-LTE network.

10. The method according to claim 9, wherein the RRC algorithm comprises an encryption algorithm and an integrity protection algorithm, and wherein the NAS algorithm comprises an encryption algorithm and an integrity protection algorithm.

11. A mobility management entity (MME) for security capability negotiation for handover from a first network to a second network, wherein the MME is in the second network, and the security capabilities include a Non-Access Signaling (NAS) algorithm, a radio resource control (RRC) algorithm and a user plane (UP) encryption algorithm, comprising:

a receiver configured to receive a handover request sent by a first network, including a NAS algorithm, a RRC algorithm and a UP encryption algorithm supported by a user equipment (UE) in the first network; and a transmitter communicatively connected to the receiver, the transmitter being configured to send the RRC algorithm and the UP encryption algorithm supported by the UE to an evolved NodeB (eNodeB) in the second network, and wherein the receiver is further configured to receive from the eNodeB a selected RRC algorithm and a selected UP encryption algorithm supported by the UE and the eNodeB, and wherein the transmitter is further configured to send the selected RRC algorithm and the selected UP encryption algorithm to the first network.

12. The MME according to claim 11, further comprising:

a processor configured to select a NAS algorithm according to the NAS algorithm supported by the UE and a NAS algorithm supported by the MME, and wherein the transmitter is further configured to send the selected NAS algorithm to the first network.

13. The MME according to claim 11, wherein the RRC algorithm comprises an encryption algorithm and an integrity protection algorithm, and the NAS algorithm comprises an encryption algorithm and an integrity protection algorithm.

14. An evolved node B (eNodeB) for security capability negotiation for handover from a first network to a second network, wherein the eNodeB is in the second network, and the security capabilities include a radio resource control (RRC) algorithm and a user plane (UP) encryption algorithm, comprising:

a receiver configured to receive a handover preparation request message from a mobility management entity (MME), wherein the handover preparation request message includes a RRC algorithm and a UP encryption algorithm supported by a user equipment (UE);

a processor configured to select an RRC algorithm and a UP encryption algorithm each supported by the UE and the eNodeB, according to the RRC algorithm and the UP encryption algorithm supported by the UE and an RRC algorithm and a UP encryption algorithm supported by the eNodeB; and a transmitter configured to send the selected RRC algorithm and the selected UP encryption algorithm to the first network.

15. The eNodeB according to claim 14, wherein the RRC algorithm comprises an encryption algorithm and an integrity protection algorithm, and the UP algorithm comprises an encryption algorithm and an integrity protection algorithm.

* * * * *